United States Patent
Rantanen-Kolehmainen et al.

(10) Patent No.: US 8,935,994 B2
(45) Date of Patent: Jan. 20, 2015

(54) GASOLINE COMPOSITIONS AND METHOD OF PRODUCING THE SAME

(75) Inventors: Leena Rantanen-Kolehmainen, Porvoo (FI); Päivi Aakko-Saksa, Porvoo (FI)

(73) Assignee: Neste Oil Oyj, Espoo (FI)

( * ) Notice: Subject to any disclaimer, the term of this patent is extended or adjusted under 35 U.S.C. 154(b) by 0 days.

(21) Appl. No.: 13/609,354

(22) Filed: Sep. 11, 2012

(65) Prior Publication Data

US 2013/0199481 A1 Aug. 8, 2013

Related U.S. Application Data

(60) Provisional application No. 61/533,242, filed on Sep. 11, 2011.

(30) Foreign Application Priority Data

Sep. 11, 2011 (FI) .................................. 20110300

(51) Int. Cl.
*F02B 43/00* (2006.01)
*C10L 1/185* (2006.01)
(Continued)

(52) U.S. Cl.
CPC ............... *C10L 1/1852* (2013.01); *C10L 1/182* (2013.01); *C10L 1/06* (2013.01); *C10L 2200/0469* (2013.01)
USPC .............................. 123/1 A; 44/451; 44/452

(58) Field of Classification Search
USPC ................ 123/1 A, 1 R; 44/449, 451, 452
See application file for complete search history.

(56) References Cited

U.S. PATENT DOCUMENTS

| | | | |
|---|---|---|---|
| 4,398,921 A | * | 8/1983 | Rifkin et al. .................... 44/351 |
| 6,113,661 A | * | 9/2000 | Germanaud et al. ............ 44/444 |

(Continued)

FOREIGN PATENT DOCUMENTS

| | | | |
|---|---|---|---|
| DE | 102010017818 A1 | * | 8/2011 |
| EP | 2177587 A1 | | 4/2010 |

(Continued)

OTHER PUBLICATIONS

Translation of DE 102010017818A1, 2011.*

(Continued)

*Primary Examiner* — Noah Kamen
*Assistant Examiner* — Long T Tran
(74) *Attorney, Agent, or Firm* — Seppo Laine Oy; Joshua P. Wert

(57) ABSTRACT

Gasoline fuel and method of making and using it. The fuel comprises from 5 to 20 vol.-% paraffinic hydrocarbons originating from biological oils, fats, or derivatives or combinations thereof. Further, it comprises oxygenates, such as ethanol present in a concentration of about 5 to 15 vol.-%; or iso-butanol present in a concentration of 5 to 20 vol.-%, preferably about 10 to 17 vol.-%; or ETBE present in a concentration of 7 to 25 vol.-%, preferably about 15 to 22 vol.-%. The bioenergy content of the gasoline is at least 14 Energy equivalent percentage ($E_{eqv}$-%) calculated based on the heating values given in the European Renewable Energy Directive 2009/28/EC. By means of the invention, fuels with a high bioenergy content are provided which can be used in conventional gasoline-fuelled automotive engines.

7 Claims, 3 Drawing Sheets

(51) Int. Cl.
*C10L 1/182* (2006.01)
*C10L 1/06* (2006.01)

(56) References Cited

U.S. PATENT DOCUMENTS

| | | | |
|---|---|---|---|
| 7,029,506 B2* | 4/2006 | Jordan | 44/307 |
| 7,854,774 B2* | 12/2010 | Renninger et al. | 44/451 |
| 2003/0093943 A1* | 5/2003 | Jordan | 44/307 |
| 2003/0167679 A1* | 9/2003 | Jordan | 44/324 |
| 2006/0101712 A1 | 5/2006 | Burnett et al. | |
| 2008/0000149 A1* | 1/2008 | Aradi | 44/359 |
| 2008/0202020 A1* | 8/2008 | Narayan et al. | 44/308 |
| 2008/0302001 A1 | 12/2008 | Koivusalmi et al. | |
| 2009/0013591 A1* | 1/2009 | Bradin et al. | 44/452 |
| 2009/0031617 A1 | 2/2009 | O'Rear | |
| 2009/0288337 A1* | 11/2009 | Picataggio et al. | 44/449 |
| 2010/0077655 A1 | 4/2010 | Bauldreay et al. | |
| 2010/0131247 A1 | 5/2010 | Carpenter et al. | |
| 2010/0275509 A1* | 11/2010 | Sakuma et al. | 44/438 |
| 2011/0015459 A1 | 1/2011 | Aalto et al. | |
| 2011/0076732 A1* | 3/2011 | Dumenil et al. | 435/160 |
| 2011/0138681 A1 | 6/2011 | Ramirez Corredores et al. | |

FOREIGN PATENT DOCUMENTS

| | | |
|---|---|---|
| EP | 2290035 A1 | 3/2011 |
| WO | WO2004022674 A1 | 3/2004 |

OTHER PUBLICATIONS

Bielansky P et al: "Catalytic cracking of rapeseed oil to high octane gasoline and olefins", Chemical Engineering and Processing, Elsevier Seuoia, Lausanne, CH, vol. 49, No. 8, Aug. 1, 2010.

Tian H et al: "Alternative Processing Technology for Converting Vegetable Oils and Animal Fats to Clean Fuels and Light Olefins", Chinese Journal of Chemical Engineering, Chemical Industry Press, Beijing, CN, vol. 16, No. 3, Jun. 1, 2008.

* cited by examiner

GASOLINE COMPOSITIONS AND METHOD OF PRODUCING THE SAME

BACKGROUND OF THE INVENTION

1. Field of the Invention

The present invention relates to gasoline compositions suitable as automotive fuels. In particular, the invention concerns gasoline compositions containing hydrocarbons derived from renewable hydrocarbon sources and methods of producing such gasolines. The present invention also relates to a method of reducing the emissions of one or more pollutants, selected from the group consisting of unsaturated and aromatic compounds, such as diolefines and benzene, from an automotive engine.

2. Description of Related Art

Ethanol is the dominant liquid biofuel globally at present. This is at least partly because it is readily available. The most common process for producing bioalcohols (i.e. alcohols obtained from renewable sources) is by fermentation of a sugar-type feedstock using yeast. Alternative routes for converting various biomasses to bioalcohols include thermochemical processing, for example biomass gasification followed by alcohol synthesis, or gasification followed by fermentation using anaerobic bacteria.

There are a number of studies on the effects of low-concentration ethanol additions on exhaust emissions. Ethanol generally has a positive impact on CO and HC tailpipe emissions. Conversely, $NO_x$ emissions tend to increase when ethanol is added to gasoline. The ozone-forming potential tends to increase with ethanol/gasoline blends due to the increased evaporative, acetaldehyde and $NO_x$ emissions. The ethanol content of fuel does not generally influence benzene and 1,3-butadiene emissions. Particulate matter emissions from gasoline-fuelled cars are typically low. The major drawback of adding ethanol to gasoline is an increase in emissions of acetaldehyde, which is classified as a harmful "air-toxic" substance. A catalyst can efficiently remove aldehyde emissions, but not in all conditions, for example during a cold start.

The European Union requires biofuels to achieve at least a 10% share of transport energy by 2020, and even higher shares are being attempted regionally.

The use of ethanol in conventional gasoline cars is generally limited to 10-15 v/v % (vol.-%, approx. 7-10 as an energy equivalent percentage) due to technical restrictions. Fuels with an oxygen content higher than approx. 4 m/m % are not necessarily compatible with conventional spark-ignited cars. Today, higher ethanol blending ratios are therefore possible only by using Flexible Fuel Vehicle (FFV) technology designed to use any proportion of, for example, ethanol and gasoline in the blend.

Present conventional cars will, however, continue to take the major share of gasoline car fleets for the next 10 to 20 years at least, and it is therefore necessary to establish and assess alternative biocomponent options for them.

SUMMARY OF THE INVENTION

It is an aim of the present invention to eliminate at least some of the problems relating to the known technology and to provide new gasolines using renewable components having a high bio-share in the gasoline and good compatibility with conventional cars.

It is a further aim of the invention to provide a novel gasoline fuel, which is at least partially based on hydrocarbons derived from renewable sources while still meeting stringent exhaust emission limits.

It is another object of the invention to provide a method of reducing the emissions of an automotive engine of one or more pollutants selected from the group consisting of unsaturated and aromatic compounds compared to combusting a conventional fuel based on fossil hydrocarbons.

These and other objects of the invention and benefits associated therewith will become evident from the following detailed description of the invention.

The present invention is based on the finding that a gasoline fuel containing increased proportion of components derived from renewable sources can be formulated by incorporating paraffinic hydrocarbons originating from biological oils, fats or combinations thereof, optionally together with oxygenates into a hydrocarbon fuel composition.

Particularly suitable hydrocarbons originate from a process wherein a feed of biological oils, natural fats or combinations thereof is hydrotreated in a hydrotreating step and optionally isomerized in an isomerisation step.

The paraffinic and optionally isomerized hydrocarbons are blended with other, in particular fossil derived hydrocarbons and optionally co-blended with oxygenates to provide a gasoline fuel composition.

The use of the novel gasoline provides for a method of reducing the emissions of an automotive engine of one or more pollutants selected from the group consisting of diolefins and benzene compared to combusting a fuel containing hydrocarbons derived only from fossil sources.

Considerable advantages are obtained by the invention. Thus, the present invention provides for fuels with a high bioenergy content which can be used with conventional gasoline-fuelled cars. As the results discussed below show, the bioenergy content of gasoline can be increased to up to 30% for use with conventional gasoline-fuelled car engines, which are not necessarily compatible with a fuel oxygen content higher than approximately 4 m/m %.

Use of lower alcohols, such as ethanol, isobutanol or n-butanol, or tertiary alkyl ethers, such as ETBE, or blends of these together with renewable hydrocarbon components in gasoline, as discussed herein, does not harmfully impact emissions from conventional cars.

On the contrary, combinations of a renewable component with oxygenates indicate a reduced exhaust toxicity when compared with fossil fuel.

Gasoline range bio-hydrocarbons of the present kind are advantageous since they are fully compatible with conventional gasoline, cars and current infrastructure.

Next the invention will be examined more closely with the aid of a detailed description and with reference to the attached drawings.

DETAILED DESCRIPTION OF PREFERRED EMBODIMENTS

Figures 1A, 1B:
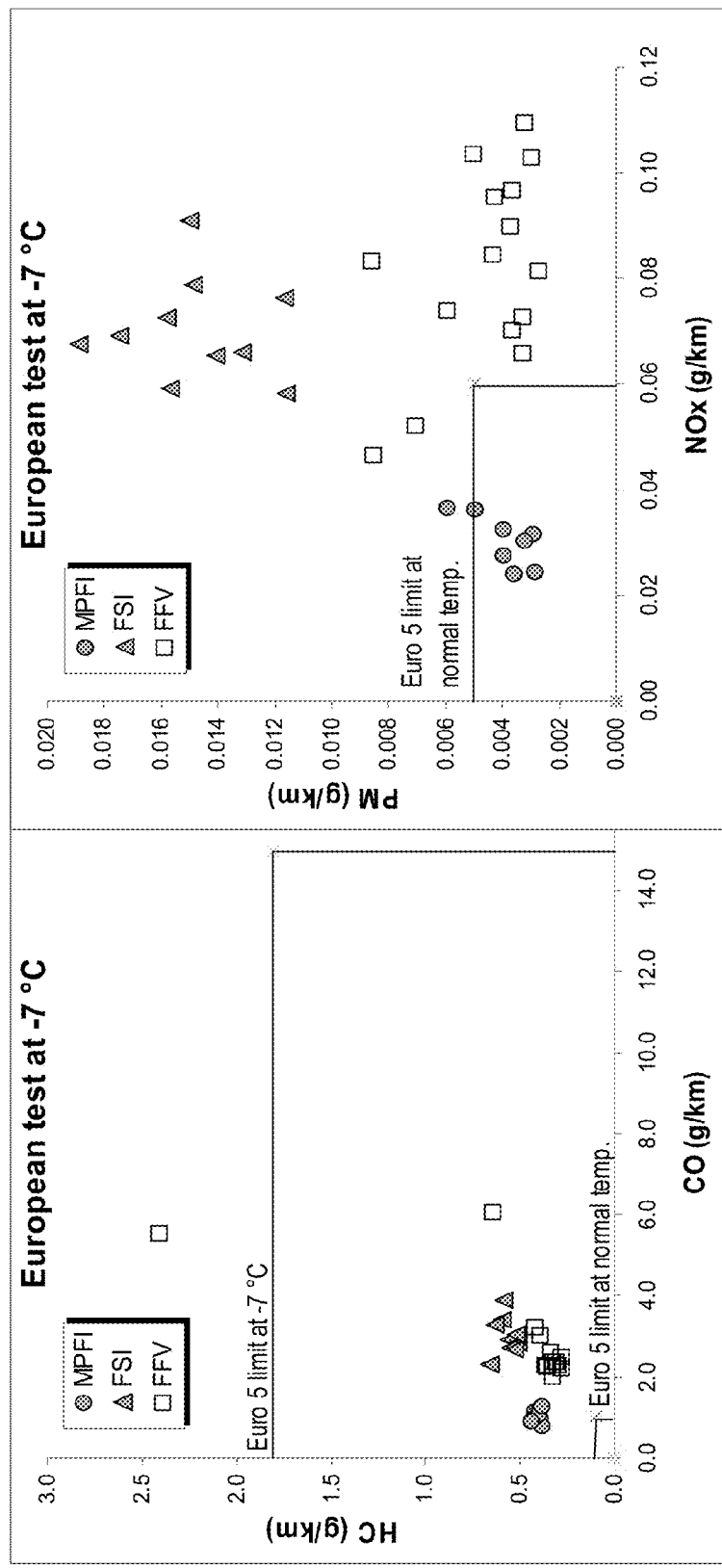
FIGS. 1A and 1B show CO, HC, NOx and particulate matter emissions levels of cars and the respective Euro 5 limit values at −7° C. and at normal temperatures.

The present invention relates to gasoline fuels which comprises in combinations paraffinic and optionally isomerized hydrocarbons (i.e. alkanes) originating from biological oils, fats or derivatives or combinations thereof, and oxygenates.

As will be discussed in greater detail below, the hydrocarbons may be derived from a raw-material selected from plant oils, plant fats, animal fats and animal oils, algae, yeast and mould, and mixtures thereof. Examples of particularly suitable biological oils and fats include fish fats and fish oils, rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil or fats contained in milk, recycled fats of vegetable and animal origin derived from the food industry, and mixtures of two or more of these raw-materials.

In a preferred embodiment, the concentration of the paraffinic and optionally isomerized, or at least partially isomerized, hydrocarbons originating from biological oils, fats or derivatives or combinations thereof in the fuel ranges from 5 to 20 vol.-%, preferably from about 10 to about 15 vol.-%, calculated from the total volume of the fuel. The energy content obtained by the incorporation of the hydrocarbons will be discussed below.

In the present context, the term "originate from" is used to designate the source of the hydrocarbons. Hydrocarbons are obtained from the indicated source or feedstock by suitable processing, in particular suitable chemical processing, as will be explained below in more detail. Thus, the term "originate from" in practice is used synonymously with "obtained from" or "obtainable from".

In another preferred embodiment, the oxygenates are selected from the group of alcohols and ethers; preferably the oxygenates are selected from the group of lower aliphatic alcohols, such as ethanol, n- or i-propanol, n- or i-butanol, or from the group of tertiary alkyl ethers, such as ethyl tertiary butyl ether (ETBE) and tertiary amyl methyl ether (TAME).

It should be noted that, as a gasoline component, butanol in its isomeric forms has many advantages over ethanol: higher energy content, lower vapour pressure, lower phase separation risk and being less aggressive towards materials. There are some differences between the isomers of butanol, for example the octane numbers of isobutanol are higher than those for n-butanol.

Ethanol can be further converted into ethyl-tertiary-butyl-ether (ETBE) by catalytic reaction with isobutylene, which at present is a fossil feedstock. Similarly, methanol is processed to methyl-tertiary-butyl-ether (MTBE). Both ETBE and MTBE have excellent fuel properties as gasoline components, for example high octane numbers, low vapour pressures, no phase separation risk and good performance with materials. As gasoline components, ethers are preferred over alcohols In the present context, ethyl tertiary butyl ether, isobutanol and ethanol are particularly preferred oxygenates.

Thus, in one particular embodiment, the oxygenate is selected from
  ethanol which may be present in a concentration of about 5 to 15 vol.-%; or
  isobutanol which may be present in a concentration of 5 to 20 vol.-%, preferably about 10 to 17 vol.-%; or
  ETBE which may be present in a concentration of 7 to 25 vol.-%, preferably about 15 to 22 vol.-%; or
  a combination two or three of the above components.

In a preferred embodiment, the concentration of oxygen is 5 mass % at maximum, preferably about 0.1 to 4.5 mass %. The percentage is calculated from the total mass of the composition.

The fuel according to any of the preceding claims, wherein a bio-hydrocarbon component is incorporated into the fuel composition, preferably in combination with oxygenates, has a significant bioenergy content. Preferably, the bioenergy content is at least 14 Energy equivalent percentage ($E_{eqv}$-%), in particular, it is about 15 to 35 $E_{eqv}$%. The Energy Equivalent percentage is calculated based on the heating values given in the European Renewable Energy Directive 2009/28/EC.

In a particular embodiment, a gasoline fuel composition is provided which exhibits, in combination,
  an octane value (R+M)/2 of at least 85;
  a total aromatics content of 35 vol. % at maximum and less than 0.5 mass % of benzene;
  a vapour pressure of 69±2 kPa;
  a concentration of oxygen not exceeding 5 mass %; and
  at least 14% of Energy equivalent of paraffinic and isomerized or at least partially isomerized $C_2$ to $C_{14}$ hydrocarbons, in particular $C_3$ to $C_{12}$ typically $C_5$ to $C_{12}$ hydrocarbons, originating from biological oils, natural fats or combinations thereof.

It has been found that the novel fuels produce low emissions of diolefins and benzene. This provides for a method of reducing the emissions of an automotive engine of one or more pollutants selected from the group consisting of diolefins and benzene compared to combusting a fuel containing hydrocarbons derived only from fossil sources, which comprises the steps of
a) introducing into the automotive engine a gasoline comprising paraffinic and optionally isomerized hydrocarbons originating from biological oils, fats or combinations thereof, and oxygenates;
b) combusting the gasoline in the engine;
c) introducing at least some of the resultant engine exhaust emissions into a catalytic converter; and
d) discharging emissions from the catalytic converter to the atmosphere.

Preferably, the present fuels as used in an automotive engine selected from multi-point 1 injection engines (MPFI) and direct-injection engine (FSI), both capable of consistently using a fuel containing a maximum of 4 mass % oxygen or less.

The present hydrocarbon composition comprises generally or even consists of or consists essentially of $C_2$ to $C_{14}$ hydrocarbons. In one embodiment, the compositions are based on $C_3$ to $C_{12}$, typically $C_5$ to $C_{12}$ hydrocarbons, in another the compositions comprise or consist of or consists essentially of light hydrocarbons such as aliphatic $C_2$ to $C_8$ hydrocarbons.

In a preferred embodiment, the present hydrocarbons contain virtually no unsaturated compounds (at least 95 vol.-%, preferably at least 98 vol.-%) of the hydrocarbons are paraffinic.

In another preferred embodiment, a part, preferably a significant part of the hydrocarbons are isomerized (branched) paraffines/alkanes. In particular, at least about 15 vol.-%, suitably at least 40 vol.-%, advantageously at least 50 vol.-%, typically at least 75 vol.-% are branched, calculated from the total volume of the hydrocarbons. In practice, the proportion of such isomerized paraffines in the present hydrocarbon composition derived from the biological oils or fats or combinations thereof can be as high as 80 vol.-% or even higher (85 to 95 vol.-%). The remaining part of the paraffines are typically linear (unbranched).

The boiling point range of the present hydrocarbon composition falls into the range stipulated for gasolines. Typically it is from about 40 to about 220° C., in particular about 50 to 200° C., for example about 60 to 150° C.

The present hydrocarbons originate from biological oils, natural fats or combinations thereof. In particular, the hydrocarbons are produced from biological oils, natural fats or combinations thereof by a process explained in more detail below.

The feedstock may comprise or consist of or consist essentially of various oils and/or fats originating from biological and renewable sources, for example fats and oils originating from plants and/or animals and/or fish and/or insects and compounds derived from them as well as oils and fats and oils obtained from microbiological processes. Said oils and fats typically comprise or consist essentially of $C_{10}$-$C_{24}$ fatty acids, derivatives thereof, such as esters of fatty acids as well as triglycerides of fatty acids or combinations of thereof. Fatty acids or fatty acid derivatives, such as esters may be produced via hydrolysis of said oils and fats or by their fractionalization or transesterification reactions of triglycerides or by microbiological processes utilizing algae or microbes, such as yeasts, molds or bacteria.

The basic structural unit of said oil or fat is a triglyceride, but typically also diglycerides and free fatty acids are comprised therein. Triglyceride is a triester of glycerol with three fatty acid molecules, having the structure presented in the following formula I:

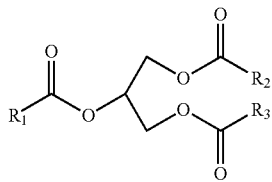

Formula I. Structure of triglyceride

In Formula I, $R_1$, $R_2$ and $R_3$ are alkyl chains. Fatty acids found in natural triglycerides are almost solely fatty acids of even carbon number. Therefore $R_1$, $R_2$, and $R_3$ typically are $C_5$-$C_{23}$ alkyl groups, mainly $C_{11}$-$C_{19}$ alkyl groups and most typically $C_{15}$ or $C_{17}$ alkyl groups. $R_1$, $R_2$, and $R_3$ may contain carbon-carbon double bonds. These alkyl chains can be saturated, unsaturated or polyunsaturated.

The natural fat used in the invention is typically an animal or plant fat or oil (here, oils are defined as fats) selected from: the lauric-myristic acid group ($C_{12}$ to $C_{14}$) including milk fats, as well as coconut oil, palmseed oil, babassu oil, muscat butter oil, laurel seed oil; from the palmitic acid group ($C_{16}$) including earth animal fats, as well as palm oil and stillingia tallow; the stearic acid group ($C_{18}$) including fats of earth animals, as well as cocoa butter, shea butter and Borneo tallow; the oleic and linoleic acid group (unsaturated $C_{18}$) including whale and fish oils as well as tall oil (fatty acid fraction), rapeseed or canola oil, olive oil, peanut oil, sesame oil, maize oil, sunflower oil, poppy seed oil, cottonseed oil and soy oil; the linolenic acid group (unsaturated $C_{18}$) further including linseed oil, perilla oil and hemp oil; the erucic acid group (unsaturated $C_{22}$) including whale and fish oils as well as rapeseed oil and mustard seed oil; the eleostearic acid group (conjug. unsaturated $C_{18}$) including whale and fish oils as well as Chinese wood oil; and fats with substituted fatty acids (ricinoleic acid, $C_{18}$) such as castor oil. Suitable oils or fats are also Jatropha seed oils as well as fats and oils originating from processes using microbes, such as algae, bacteria, yeasts and moulds.

Derivatives of natural fats include mono- or diglycerides of $C_{10}$ to $C_{28}$ fatty acids, $C_{10}$ to $C_{28}$ fatty acids, $C_{10}$ to $C_{28}$ fatty acid anhydrides, non-glyceride $C_{10}$ to $C_{28}$ fatty acid esters, $C_{10}$ to $C_{28}$ fatty alcohols, $C_{10}$ to $C_{28}$ fatty aldehydes and $C_{10}$ to $C_{28}$ fatty ketones. The $C_{10}$ to $C_{28}$ fatty acids, their mono- and diglycerides, as well as their anhydrides are typically prepared by hydrolysis of the corresponding triglyceride. The non-glyceride $C_{10}$ to $C_{28}$ fatty acid esters are mainly prepared from the triglycerides by transesterification. The $C_{10}$ to $C_{28}$ fatty alcohols, aldehydes and ketones are prepared by reduction, usually by hydrogenation, of the corresponding fatty acids.

The derivatives of natural fats also include any of the aforementioned natural fats and derivatives, the hydrocarbon chain of which has been modified e.g. by substitution, branching or saturation.

The natural fats or derivatives thereof can be provided in pure form or as part of a feedstock containing other components. Preferably, the feedstock contains at least 20% by weight, more preferably at least 30% by weight, in particular at least 40% by weight, of pure natural fat or fatty derivative. Contaminating metals may be removed from the feedstock e.g. by treatment with mineral acids. Phosphorus which mostly occurs in the form of phosphatides may be removed by degumming, and the amount of free fatty acids may be reduced e.g. by dry distillation or steam stripping. Finally, the raw material may be bleached or deodorized or both.

The triglycerides can also be prehydrogenated in order to reduce unsaturation, sulphur and nitrogen content.

A hydrocarbon composition for use in the present gasoline fuel compositions can be obtained from the above biological fats feedstock by various processes.

Thus, in a first embodiment, the feedstock is subjected to deoxygenation step.

Herein, by "deoxygenation" is meant partial or complete removal of oxygen from the molecules of the above-mentioned triglycerides, fatty acids, fatty acid analogues or derivatives. The deoxygenation operation may involve, for example, hydrogenation (reaction with hydrogen), hydrolysis (reaction with water), decarbonylation (removal of carbonyl as carbon monoxide) and/or decarboxylation (removal of carboxyl as carbon dioxide).

Products of a deoxygenation step comprise aliphatic $C_9$ to $C_{28}$ hydrocarbons, preferably aliphatic $C_{11}$ to $C_{24}$ hydrocarbons, more preferably aliphatic $C_{11}$ to $C_{20}$ hydrocarbons, in particular aliphatic $C_{15}$ to $C_{1-8}$ hydrocarbons.

According to one embodiment, which is discussed in more detail in WO 2010/043765, the contents of which are herewith incorporated by reference, deoxygenation using carbon monoxide as a reducing agent include a temperature from 150 to 350° C. and a pressure from 0.1 to 150 bar. Preferably the temperature is from 200 to 300° C. The pressure is preferably from 1 to 100 bar. A metal or metal carbonyl complex can be used as a catalyst, in the latter case, the pressure ranges preferably from 2 to 100 bar. Deoxygenation is typically carried out in the presence of water. The molar amount of water used is +25 mol % with respect to the molar amount of carbon monoxide used. Carbon monoxide is used in an amount corresponding to at least the stoichiometric amount calculated from the oxygen content of the feedstock.

Advantageously, the reaction conditions in the deoxygenation step are selected so as to maintain the feedstock and the products in liquid phase. A typical reaction time is typically between 1 and 30 hours.

The products of a deoxygenation step are aliphatic $C_9$ to $C_{28}$ hydrocarbons, preferably aliphatic $C_{11}$ to $C_{24}$ hydrocarbons, in particular aliphatic $C_{11}$ to $C_{20}$ hydrocarbons, typically aliphatic $C_{15}$ to $C_{18}$ hydrocarbons.

$C_9$ to $C_{28}$ hydrocarbons obtained from deoxygenation typically exhibit low amounts of unsaturation and heteroatom impurities. Such hydrocarbons are especially suitable for hydrocracking to form lower hydrocarbons. Optionally the hydrocracking is carried out after a purification step.

In hydrocracking aliphatic light hydrocarbons are formed such as gasoline. Thus, it is preferred to produce by the hydrocracking step aliphatic $C_2$ to $C_{14}$ hydrocarbons, such as aliphatic $C_2$ to $C_8$ hydrocarbons, i.e. light gasoline.

Hydro-cracking is a cracking process which uses a catalyst, hydrogen pressure and moderate temperatures. Hydrocracking mainly differs from thermal and catalytic cracking in that its product contains relatively little olefins and aromatics. Furthermore, harmful heteroatom (S and N) compounds are in the hydrocracking step reduced by hydrogen into less harmful derivatives, such as $H_2S$ and $NH_4-$, or optionally removed. This is advantageous, because unsaturation may lead to unwanted by-products and heteroatom impurities may disturb the actual cracking reactions.

An aliphatic $C_2$ to $C_{14}$ hydrocarbon originating from a hydrocracking step or otherwise provided is preferably isomerized in order to refine it into a high-quality light fuel. When a $C_2$ to $C_{14}$ hydrocarbon obtained, e.g., after the previously discussed deoxygenation and hydrocracking steps, is isomerized, a product is obtained having greatly improved octane number.

Isomerisation of the hydrocarbons obtained can be carried out at a temperature between 100 and 500° C., preferably between 150 and 400° C., in particular at 200 to 300° C. The pressure can be in the range of 1 and 20 MPa, more preferably between 2 and 15 MPa, in particular between 2 and 10 MPa.

Isomerisation of the hydrocarbons is preferably carried out in the presence of a catalyst based on a hydrogen transfer component and an acid component. Advantageously, the hydrogen transfer (hydrogenating and/or dehydrogenating) component is a transition metal selected from Groups 5-10 of the Periodic Table (IUPAC 1990), more preferably selected from Ni, Pd, Pt, Co, Mo and V, and most preferably is platinum. The acid selected from chlorinated alumina and protonated 10- and 12-membered zeolites, even more preferably selected from protonated PSH-3, Beta- and MCM-22 zeolites. Most preferably the acid component is protonated mordenite, protonated beta-zeolite or protonated ZSM-12.

The preferred transition metal content of the catalyst used in isomerization is 0.01 to 5 wt.-%, preferably 0.1 to 1 wt.-%.

With regard to the combined steps of deoxygenation, hydrocracking and isomerization as processing steps of a feedstock comprising biological oils, fats and derivatives and combinations thereof reference is made to US Patent Application Publication No. 2011/0015459, the contents of which are herewith incorporated by reference.

Based on the above, according to one preferred embodiment, the isomerized hydrocarbons of the present fuel originate (in particular they are obtained) from a process wherein a feed of biological oils, natural fats or combinations thereof is hydrotreated in a hydrotreating step and isomerized in an isomerisation step.

In particular, the present isomerized hydrocarbons can be derived from a natural fat or derivative thereof by a process involving the steps of
  providing a natural fat or derivative thereof;
  deoxygenating said natural fat or derivative thereof to yield an aliphatic $C_9$ to $C_{28}$ hydrocarbon;
  hydrocracking said aliphatic $C_9$ to $C_{28}$ hydrocarbon thus obtained to yield a product comprising an aliphatic $C_2$ to $C_{14}$ hydrocarbon;
  isomerizing said aliphatic $C_2$ to $C_{14}$ hydrocarbon thus obtained into an isomerized aliphatic $C_2$ to $C_{14}$ hydrocarbon composition, and
  recovering said isomerized $C_2$ to $C_{14}$ hydrocarbon.

Above, the provision of a bio-hydrocarbon component from biological oils, fats and derivatives and combinations thereof is described with particular reference to processing primarily aiming at producing light hydrocarbons, such as gasoline, from said feedstock. It should be pointed out that suitable gasoline fractions are also obtainable by other process. For example, a suitable product is obtained from BTL hydroprocessing as a side product of the main product stream comprising renewable diesel.

A suitable process is disclosed in US Patent Application Publication No. 2007/0010682, the content of which is herewith incorporated by reference. The process for manufacturing diesel range hydrocarbons comprises the steps of hydrotreating a feed and isomerizing it, wherein a fresh feed containing more than 5 wt % of free fatty acids and at least one diluting agent are hydrotreated at a reaction temperature of 200 to 400° C., in a hydrotreating reactor in the presence of catalyst. The ratio of the dilution agent to fresh feed is typically 5-30:1.

Just as was the case in the process discussed above, the hydrocarbons are preferably subjected to isomerization is carried out which causes branching of the hydrocarbon chain and results in improved performance of the product oil at low temperatures. The isomerisation produces predominantly methyl branches. The severity of isomerisation conditions and choice of catalyst controls the amount of methyl branches formed and their distance from each other and therefore cold properties of bio diesel fraction produced. The product obtained from the hydrotreatment step is isomerized under isomerisation conditions with an isomerisation catalyst.

In the isomerisation step, the pressure varies in the range of 20 to 150 bar, preferably in the range of 30 to 100 bar and the temperature varies between 200 to 500° C., preferably between 280 and 400° C.

Isomerisation catalysts known in the art can be used. Suitable isomerisation catalysts contain a molecular sieve and/or a metal selected from Group VIII of the Periodic Table and/or a carrier. Preferably, the isomerisation catalyst contains SAPO-11 or SAPO-41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$. Most of these catalysts require the presence of hydrogen to reduce the catalyst deactivation.

By the above process, an isomerized product, which is a mixture of branched hydrocarbons and preferably branched paraffins boiling in the range of 180-350° C., the diesel fuel range, and having one carbon atom less than the original fatty acid chain, is obtained. Additionally some gasoline is also produced having a boiling range of about 40 to 220° C., and that gasoline is suitable for use in the present invention.

Further, the present invention also provides a method of producing a gasoline fuel composition, which comprising the steps of
  providing a first gasoline component;
  providing a second paraffinic gasoline component comprising paraffinic and optionally isomerized $C_2$ to $C_{14}$ hydrocarbons originating from biological oils, natural fats or combinations thereof;
  providing an oxygenate; and
  blending the first gasoline component, the second gasoline component and the oxygenate to produce a gasoline fuel composition containing a concentration of oxygen not exceeding 5 mass %; and at least 14% of Energy equivalent of said isomerized $C_2$ to $C_{14}$ hydrocarbons.

The step of providing a second paraffinic gasoline component preferably comprises hydrotreating in a hydrotreating step and isomerizing in an isomerisation step a feed of biological oils, natural fats or combinations thereof.

As indicated above, the present gasoline component derived from a biological oil or natural fat of the above indicated kind makes up some 5 to 20 vol.-%, preferably from about 10 to about 15 vol.-%, of the total volume of the fuel; and the oxygenate correspondingly 5 to 25 vol.-%. Together, the bio-gasoline and oxygenate represent some 15 to 40 vol.-% of the fuel. The remaining portion of the fuel, i.e. 55 to 90 vol.-%, preferably 60 to 85 vol.-%, is formed by the conventional gasoline.

The conventional gasoline (above "first" gasoline component) can be a conventional mix of alkanes, straight chain, branched and cyclic (5 to 12 carbon atoms), such as heptanes, isooctane and cyclopentane, along with some aromatic compounds, such as ethyl benzene, derived from fossil sources. The maximum concentration of aromatics in the final gasoline composition is 35 vol.-%, in some embodiments about 27 to 35 vol.-%.

In one embodiment, the conventional hydrocarbons are isomerized, low-aromatic linear and cyclic paraffins.

EXAMPLES

Materials

The fuel matrix included 13 biofuels and one fossil fuel. The test fuels represented different bioenergy contents, oxygen contents and fuel chemistries (Table 1). Fuels, except E85 market fuel, were match-blended using fossil gasoline refinery components and gasoline biocomponents. Fuels were analyzed by Neste Oil (Porvoo, Finland).

The biocomponents used in fuel blending were ethanol, isobutanol, n-butanol, ETBE and a bio-hydrocarbon component. A paraffinic, and oxygen-, aromatic- and sulphur-free, Neste Oil Renewable gasoline component was chosen to represent liquid bio-hydrocarbons from different processes. This biogasoline component is a hydrotreated vegetable oil product (HVO) manufactured from vegetable oils and animal fats using Neste Oil's NExBTL hydroprocessing technology. The main product of the NExBTL technology ions renewable diesel, but renewable gasoline is typically formed as a side product. With regard to the NExBTL technology, reference is made to US Patent Application Publication No. 2007/0010682.

The test fuel matrix was divided into two sets: high-oxygen containing fuels (oxygen content 6 to 30 m/m %) and low-oxygen containing fuels (oxygen content 0 to 4 m/m %). Five high-oxygen containing fuels were tested only with the FFV car. The low-oxygen fuel matrix contained nine fuels and was tested using both conventional cars and the FFV car. Oxygen-free fossil hydrocarbon gasoline was used as a reference fuel in both sub-matrices.

The bioenergy content of the biofuel was a major parameter in the fuel matrix. Bioenergy as an energy equivalent percentage ($E_{eqv}$ %) was calculated using the lower heating values (LHV in MJ/l), given in the European Renewable Energy Directive 2009/28/EC, for both biocomponent and fossil gasoline, and the analyzed biocomponent concentrations for each fuel blend.

Fossil energy was substituted with 7 to 56 $E_{eqv}$ % bioenergy. Three bioenergy substitution levels (7, 14 and 21 $E_{eqv}$ %) were used. The 7 $E_{eqv}$ % bioenergy level represented currently used biocomponents, ethanol (10 v/v %) and ETBE (22 v/v %), whereas the 14 $E_{eqv}$ % level represented either butanol or bio-hydrocarbon alternatives in concentrations of 15-17 v/v %. The highest bioenergy level, 21 $E_{eqv}$ %, was designed to represent both oxygenated and non-oxygenated biocomponent alternatives. The 21 $E_{eqv}$ % bioenergy level was achieved either by adding 15 v/v % non-oxygenated bio-hydrocarbon (14 $E_{eqv}$ %) to the oxygenated component or purely by increasing the fuel's oxygenate content. Market fuel E85 represented the highest bioenergy substitution value, 56 $E_{eqv}$ %.

When fuels were blended, their aromatic contents, densities, sulphur contents and vapour pressures were kept as constant as possible. The aromatic content of the high-oxygen content fuels was 16-21 v/v %, whereas the low-oxygen containing fuel aromatics were 27-35 v/v %. The benzene content was below 0.5 m/m % in all fuels. The density of all blended fuels was 740 to 756 kg/m$^3$. The sulphur contents of all fuels were below 10 mg/km.

The vapour pressure of the gasolines was 69±2 kPa, except for the market E85 fuel (35 kPa). Research Octane Numbers (RON) were within the measuring range of the ASTM D2699 method with low-oxygen containing fuels, whereas the RON value of the high-oxygen containing fuels must be considered only indicative. Motor Octane Numbers (MON) in both fuel sets were from 86 to 92 and within the ASTM D2700 method measuring range. The E85(56) was commercial grade fuel, and its octane numbers were not measured. Typically, commercial grade E85 fulfils the Swedish standard SS 155480, with the RON around 104 and the MON around 88.

Fuels were labelled using the biocomponent abbreviation and the corresponding bioenergy content of the blend. For example, E+eth(19) fuel is an ethanol (E) and ETBE (eth) blend with a bioenergy content of 19 $E_{eqv}$ %. The abbreviations iB, nB and R were used for isobutanol, n-butanol and Renewable gasoline component, respectively. The generally recognized labelling E10, E30 and E85 was used for ethanol-containing fuels representing approximately 10, 30 and 85 v/v % ethanol.

TABLE 1

Test fuels[a].

| | Bioenergy $E_{eqv}$ % | Volume[b] v/v % | Oxygen m/m % | LHV MJ/kg |
|---|---|---|---|---|
| High oxygen content | | | | |
| E85(56) | 56 | 85 | 29.8 | 28.9 |
| E30(20) | 20 | 31 | 11.3 | 38.2 |
| E + eth(19) | 19 | 39 | 10.3 | 38.4 |
| iB + eth(20) | 20 | 36 | 7.3 | 40.1 |
| iB(21) | 21 | 25 | 5.8 | 40.9 |
| Low oxygen content | | | | |
| Fossil(0) | 0 | 0 | 0.1 | 43.6 |
| E10(7) | 7 | 10 | 3.7 | 41.4 |
| iB(14) | 14 | 16 | 3.8 | 41.6 |
| nB(15) | 15 | 17 | 4.0 | 41.5 |
| eth(7) | 7 | 21 | 3.5 | 41.5 |
| R(14) | 14 | 15 | 0.0 | 43.4 |
| R + E(22) | 22 | 26 | 4.0 | 41.4 |
| R + eth(21) | 21 | 35 | 3.4 | 41.6 |
| R + iB(28) | 28 | 32 | 3.8 | 41.5 |

[a]E = ethanol, eth = ETBE, iB = isobutanol, nB = n-butanol, R = renewable component. Number in parenthesis indicates fuel bioenergy content as $E_{eqv}$ %.
[b]Volume of ethanol, i-butanol, n-butanol, ETBE and renewable component Experimental work was carried out with three cars: a multi-point fuel injection car (MPFI), a direct-injection car (FSI) and an FFV car. The MPFI and FSI cars represent conventional cars, which are not necessarily compatible with fuels containing more than approx. 4 m/m % oxygen (corresponding to some 11 v/v % ethanol). An FFV car tolerates high-oxygen containing gasoline, e.g. up to 85% ethanol.

The MPFI car was equipped with a DOHC, 16-valve engine including Variable Valve Timing (Dual VVT-i) and variable lifting of inlet valves (Valvematic). These features enable the timing of the inlet and exhaust valves to be adjusted, and efficient adjustment of the air flow into the engine. This enhances the engine's combustion efficiency and helps to improve the fuel consumption. The FSI car was equipped with a low-displacement engine that combines petrol direct injection with turbocharging. This enhances the engine's combustion efficiency, giving a power output much higher than that of conventional, naturally aspirated engines. The performance of the FFV car was optimised for fuel containing 85% ethanol.

The tests were carried out with fourteen fuels and three cars at −7° C. In general, three replicate tests were carried out with each fuel and car combination. Fuels containing more than 4.0 m/m % oxygen were tested only with the FFV car. Two fuels, eth(7) and nB(15), were excluded from the test matrix with the MPFI car.

Methods

Tests were carried out in the engine and vehicle emissions test laboratory at VTT, Finland. Cars were tested on a chassis dynamometer in a climatic test cell. All equipment used for the measurement of the regulated gaseous emissions (exhaust dilution and collection, concentration analysis, etc.) conforms to the specifications of the Directive 70/220/EEC and its amendments (European test). In addition, several parameters were recorded at one-second intervals, e.g. speed, carbon monoxide (CO), total hydrocarbons (HC) and nitrogen oxides (NOx). The dynamometer and the basic equipment used for recording the test parameters are described in Table 2.

The standardized tests were run according to the European exhaust emissions driving cycle. The true oxygen contents and densities of the fuels were used in the calculation of the results.

TABLE 2

| Test facilities for regulated emissions | |
| --- | --- |
| Chassis dyno | Froude Consine 1.0 m, DC, 100 kW |
| Constant volume sampler | AVL CVS i60 LD, Venturi-type |
| CO, HC, NO$_x$, CO$_2$ | Pierburg AMA 2000, triple bench |

A high-capacity sampler was used to collect a sufficient mass of particles (cf. Kokko, J., Rantanen, L., Pentikainen, J., Honkanen, T., Aakko, P. and Lappi, M., "Reduced Particulate Emissions With Reformulated Gasoline", SAE Technical Paper 2000-01-2017, 2000).

The diluted exhaust gas for individual hydrocarbon analysis was collected from the same Tedlar bags that were used for measurement of the regulated emissions. The diluted exhaust gas was drawn from those bags and fed to the gas chromatograph. The hydrocarbons from C1 to C8 from diluted exhaust gas were speciated using an HP 5890 Series II gas chromatograph (AL2O3, KCl/PLOT column). Hydrocarbons were identified by retention times, and analyzed quantitatively using an external standard method. The hydrocarbons analyzed were methane, ethane, ethene, propane, propene, acetylene, isobutene, 1,3-butadiene, benzene, toluene, ethyl benzene and m-, p- and o-xylenes.

Risk factors for exhaust toxicity were calculated separately for regulated and unregulated emissions. Risk factors for regulated emissions were calculated using equation (1). Risk factors for regulated emissions were calculated using external costs for emissions defined by Directive 2009/33/EC for NMHC, NO$_x$ and PM. National values defined in Finland were used for CO and HC emissions. In total, external costs used in calculation were as follows: CO €29/tonne, HC €62/tonne, NMHC €1000/tonne, NO$_x$ €4400/tonne and PM €87000/tonne.

$$\text{"Regulated risk factor"} = \Sigma(F_X * E_X) \quad (1)$$

F=External costs of emission, €/tonne
E=Emission in exhaust gas, tonne/km
x=CO, HC, NMHC, NO$_x$, PM Risk factors for unregulated emissions were calculated using equation (2). Unit risk factors (URF) defined by OEHHA ("Technical Support Document for Cancer Potency Factors", California Environmental Protection Agency. Office of Environmental Health Hazard Assessment, May 2009), were as follows: 1,3-butadiene $17 \times 10^{-5}$, benzene $2.9 \times 10^{-5}$, formaldehyde $0.6 \times 10^{-5}$ and acetaldehyde $0.27 \times 10^{-5}$. Particulate matter emissions were already taken into account in equation (1) (URF is $30 \times 10^{-5}$ for PM according to OEHHA).

$$\text{"Unregulated risk factor"} = \Sigma(\text{URF} * c)_x \quad (2)$$

URF=Unit risk factor (OEHHA, 2009), $(\mu g/m^3)^{-1}$
c=Concentration in exhaust gas, $\mu g/m^3$
x=Formaldehyde, acetaldehyde, benzene and 1,3-butadiene The total risk factors for exhaust toxicity for each fuel were calculated as the sum of the normalized factors for regulated and unregulated emissions. The factors for regulated and unregulated emissions were normalized separately, so the factor for Fossil(0) fuel is 1 for each car. This compensates for emissions levels from different cars.

As regards calculation of HC emission for the FFV car, it should be noted that total hydrocarbon emissions are measured with a flame ionisation detector (FID). In addition to hydrocarbons, all carbon-containing compounds, as well as oxygenates, give a response with an FID. This matter is discussed by Sandström-Dahl, C., Erlandsson, L., Gåsste, J. and Lindgren, M., "Measurement Methodologies for Hydrocarbons, Ethanol and Aldehyde Emissions from Ethanol Fuelled Vehicles", SAE Technical Paper 2010-01-1557, 2010.

The FFV car model tested requires special adaptation to the fuel. Instructions received from the manufacturer included driving in on-road conditions before preconditioning on a chassis dynamometer.

Results

Regulated emissions from MPFI, FSI and FFV cars over the European test cycle at −7° C. are shown in FIGS. 1A and 1B. Euro 5 limit values for light-duty vehicles are also presented. The stability of two cars was screened by measuring one of the test fuels at the beginning and at the end of the two-month measuring period. The stability of the cars was relatively good, with only the CO and HC emissions from the FSI car increasing to some extent.

Generally, CO and HC emissions were relatively low for all cars when compared with Euro 5 limits at −7° C. CO emissions were well below the limit of 15 g/km at −7° C. HC emissions met the limit value of 1.8 g/km in cases other than the E85(56)/FFV combination. CO and HC emissions from all three cars were rather similar, whereas NOx and PM emissions were more diverse. NOx emissions for all cars were regarded as relatively low, taking the measurement temperature (−7° C.) into account. PM results varied from 3 to 17 mg/km, and were car-dependent.

As regards unregulated emissions it should be pointed out that formaldehyde, acetaldehyde, 1,3-butadiene and benzene are considered carcinogenic to humans by inhalation. The combined effect of these emissions was therefore evaluated using risk factor calculations as explained earlier in the method section.

The unit risk toxicity factors, defined by OEHHA, give 1,3-butadiene the highest unit risk among the unregulated compounds measured in this study. For benzene the unit risk is lower than for 1,3-butadiene, but higher than for the aldehyde species. When the levels of emissions of these compounds in exhaust gases are taken into account, 1,3-butadiene and benzene become the priority compounds in the evaluation of the unregulated gaseous emissions risk factors in this study.

Formaldehyde and acetaldehyde emissions were expectedly higher for oxygen-containing fuels than for Fossil(0) fuel. The highest emissions were observed for E85(56) fuel, with acetaldehyde emissions as high as 98 mg/km and formaldehyde emission 7 mg/km. With low-oxygen containing fuels, formaldehyde emissions were below 2 mg/km and acetaldehyde emissions below 4 mg/km. The level of formaldehyde emissions was higher for the butanol-containing fuels than for fuels containing ethanol or ETBE. Acetaldehyde emissions were at their highest with ethanol- and/or ETBE-containing fuels.

Emissions of 1,3-butadiene were below 3.6 mg/km for all fuels and cars. Typically, 1,3-butadiene emissions for biofuels were lower than or at the same level as for the Fossil(0) fuel, but with some exceptions. Higher 1,3-butadiene emissions were observed for iB(14) with the MPFI car, and nB(15) with the FSI and FFV cars.

However, and importantly, when same amount of isobutanol as in the iB(14) fuel was blended with renewable hydrocarbon (R+iB(28)), 1,3-butadiene emissions decreased compared with Fossil(0) fuel in all three cars. As would be expected, this was also seen in the fuel risk factor calculations, as will be examined below.

Figures 2A, 2B:
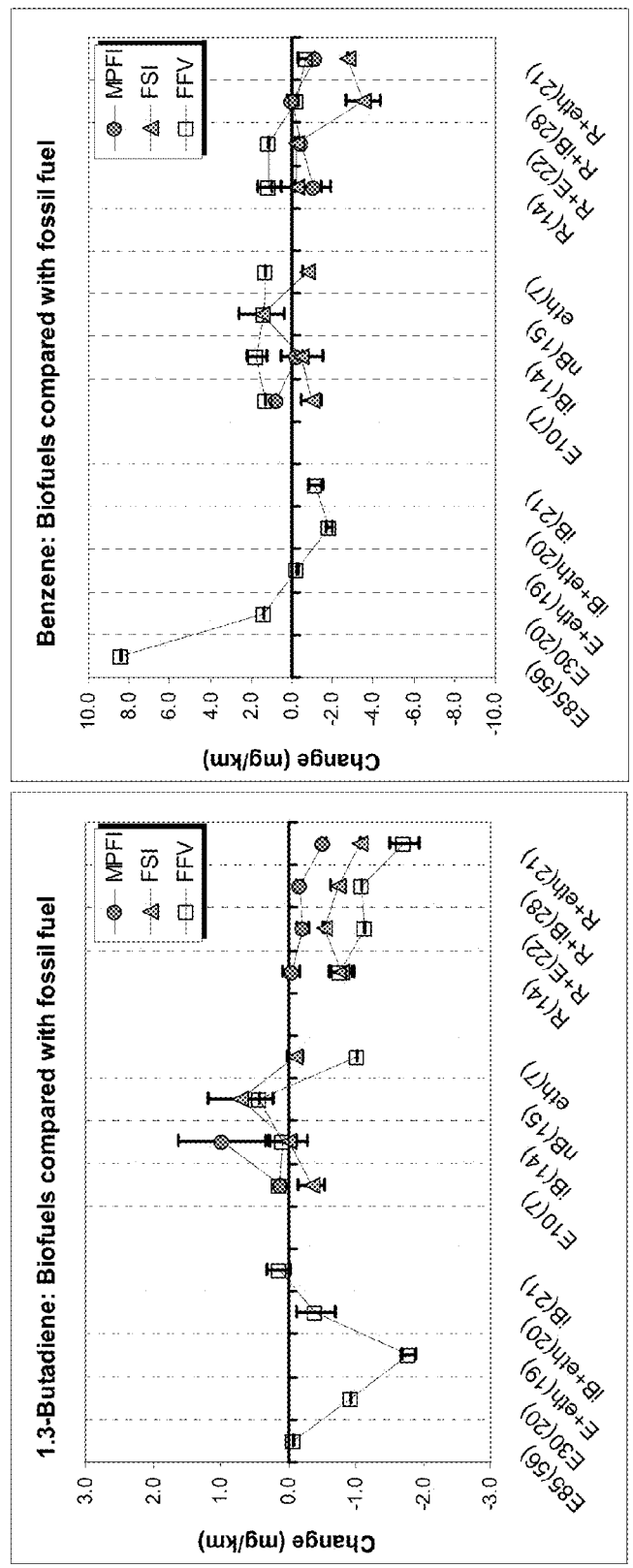
FIGS. 2A and 2B show the difference in absolute terms (change g/km) between biofuels and non-oxygenated fossil fuel. 1,3-butadiene and benzene emissions are compared with non-oxygenated fossil fuel over the European test cycle at −7° C.

FIGS. 2A and 2B show 1,3-butadiene and benzene emissions compared with non-oxygenated fossil fuel over the European test cycle at −7° C.; the difference is indicated in absolute terms (change g/km) between biofuels and non-oxygenated fossil fuel.

The results indicate that the combination of the renewable gasoline component with oxygenates in gasoline has a beneficial effect on the formation of 1,3-butadiene in engines.

The FSI car had the highest benzene emissions at around 20 mg/km. With the MPFI and FFV cars, benzene emissions were below 10 mg/km with the exception of E85(56) fuel, which resulted in benzene emissions as high as 17 mg/km regardless of the low benzene content of the fuel.

The risk factors for exhaust toxicity were calculated separately using regulated and unregulated emissions. The risk factor based on unregulated exhaust emissions toxicity was evaluated by calculating the weighted sum of the 1,3-butadiene, benzene, formaldehyde and acetaldehyde emissions. Particulate matter and NOx emissions were the most important regulated emissions affecting the unregulated risk factor.

Figure 3:
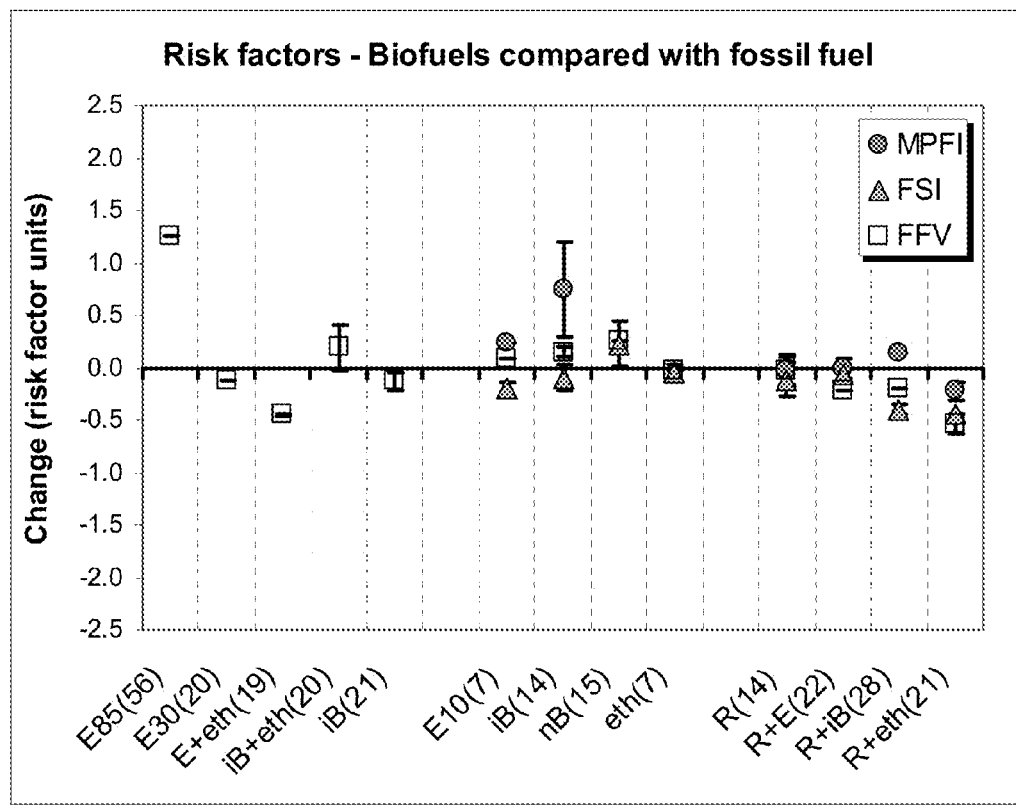
FIG. 3 shows the risk factors for exhaust toxicity calculated from the regulated and unregulated emissions with biofuels in comparison with fossil fuel. European test cycle at −7° C.

Most biofuels had total exhaust toxicity risk factors lower than or similar to those of fossil fuel for all cars tested (FIG. 3). This applies to fuels containing ethanol, isobutanol, ETBE and/or renewable components.

The risk factor calculated using regulated emissions was less sensitive to emissions changes between fuels than was the unregulated emissions toxicity risk factor. Notable risk factor differences were therefore seen only with the unregulated risk factor, with some exceptions in the regulated emissions risk factor.

E85(56) fuel was clearly more noxious than fossil gasoline, with a significantly higher overall exhaust toxicity risk factor (3.2 vs. 2.0). This was mainly due to acetaldehyde, benzene and PM emissions. When the ethanol content of the fuel was reduced from 85 to 30 v/v %, the exhaust toxicity risk factor diminished.

Two fuels were better than the others in diminishing toxicity calculated using the emission risk factor. On the one hand, fuel containing a renewable gasoline component and ETBE (R+eth(21)) had a lower risk factor than did fossil fuel (0.6-0.7 vs. 1.0) in all cars, mainly due to the lower 1,3-butadiene and benzene emissions. On the other hand, the high-oxygen containing fuel E+eth(19) resulted in a diminished risk factor (0.6 vs. 1.0) in the FFV car mainly due to the low 1,3-butadiene emissions.

The results show that there are many options for increasing the bioenergy content of gasoline by up to 30% without increasing the gasoline oxygen content to a higher level than can be tolerated by conventional gasoline cars. This means that various fuels with a high bioenergy content and different chemistries can be used with conventional gasoline-fuelled cars. In most cases, using ethanol, isobutanol, n-butanol, ETBE or blends of these together with renewable hydrocarbon components in gasoline does not significantly or harmfully impact emissions from conventional cars.

In particularly preferred embodiments, the combination of a renewable component with oxygenates indicated a reduced exhaust toxicity when compared with fossil fuel.

The invention claimed is:

1. A gasoline fuel comprising paraffinic hydrocarbons originating from biological oils, fats, or derivatives or combinations thereof, and oxygenates, wherein the fuel has a bioenergy content of at least 14 Energy equivalent percentage ($E_{eqv}$-%), said Energy Equivalent percentage being calculated based on the heating values given in the European Renewable Energy Directive 2009/28/EC, and wherein the fuel exhibits in combination:
   an octane value (R+M)/2 of at least 85:
   a total aromatics content of 35 vol. % at maximum and less then 0.5 mass % of benzene;
   a vapour pressure of 69 ±kpa;
   a concentration of oxygen not exceeding 5 mass %; and
   at least 14% of Energy equivalent of isomerized $C_2$ to $C_{14}$ hydrocarbons originating from biological oils, natural fats or combinations thereof.

2. Gasoline fuel comprising paraffinic hydrocarbons originating from biological oils, fats, or derivatives or combinations thereof, and oxygenates, wherein the hydrocarbons are derived from a raw-material selected from plant oils, plant fats, animal fats and animal oils and oil originating from algae, yeast, or mould, and mixtures thereof, and wherein the raw-material is selected from fish fats and fish oils, rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil or fats contained in milk, recycled fats of vegetable and animal origin derived from the food industry, and mixtures of two or more of these raw-materials.

3. A gasoline fuel composition, exhibiting in combination an octane value (R+M)/2 of at least 85;
   a total aromatics content of 35 vol. % at maximum and less than 0.5 mass % of benzene;
   a vapour pressure of 69 ±kPa;
   a concentration of oxygen not exceeding 5 mass %; and
   at least 14% of Energy equivalent of isomerized $C_2$ to $C_{14}$ hydrocarbons originating from biological oils, natural fats or combinations thereof.

4. A method of producing a gasoline fuel composition, comprising the steps of providing a first gasoline component;
providing a second paraffinic gasoline component comprising paraffinic $C_2$ to $C_{14}$ hydrocarbons originating from biological oils, natural fats or combinations thereof, optionally obtained after hydrogenation of said oils, fats or combinations thereof;
providing an oxygenate; and
blending the first gasoline component, the second gasoline component and the oxygenate to produce a gasoline fuel composition containing a concentration of oxygen not exceeding 5 mass %; and at least 14% of Energy equivalent of said $C_2$ to $C_{14}$ hydrocarbons.

5. The method according to claim 4, wherein the step of providing a second paraffinic gasoline component comprises hydrotreating in a hydrotreating step and isomerising in an isomerisation step a feed of biological oils, natural fats or combinations thereof.

6. A method of reducing the emissions of an automotive engine of one or more pollutants selected from the group consisting of diolefins and benzene compared to combusting a fuel containing components derived only from fossil sources, comprising
   a) introducing into said automotive engine a gasoline comprising paraffinic hydrocarbons originating from biological oils, fats, or derivatives or combinations thereof, and oxygenates or a gasoline produced by providing a first gasoline component; providing a second paraffinic gasoline component comprising paraffinic $C_2$ to $C_{14}$ hydrocarbons originating from biological oils, natural fats or combinations thereof, optionally obtained after hydrogenation of said oils, fats or combinations thereof; providing an oxygenate; and blending the first gasoline component, the second gasoline component and the oxygenate to produce a gasoline fuel composition containing a concentration of oxygen not exceeding 5 mass %; and at least 14% of Energy equivalent of said $C_2$ to $C_{14}$ hydrocarbons;
   b) combusting the gasoline in said engine;
   c) introducing at least some of the resultant engine exhaust emissions into a catalytic converter; and
   d) discharging emissions from the catalytic converter to the atmosphere.

7. The method according to claim 6, the automotive engine is a multi-point fuel injection engine (MPFI) or a direct-injection engine (FSI), capable of consistently using a fuel containing a maximum of 4 mass % oxygen or less.

\* \* \* \* \*